United States Patent
Singh et al.

(10) Patent No.: US 9,902,425 B2
(45) Date of Patent: Feb. 27, 2018

(54) SYSTEM FOR GUIDING TRAILER ALONG TARGET ROUTE DURING REVERSING MANEUVER

(71) Applicant: Jaguar Land Rover Limited, Coventry (GB)

(72) Inventors: Harpreet Singh, Coventry (GB); Andrew Bradley, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/900,563

(22) PCT Filed: Jul. 3, 2014

(86) PCT No.: PCT/EP2014/064270
§ 371 (c)(1),
(2) Date: Dec. 21, 2015

(87) PCT Pub. No.: WO2015/001066
PCT Pub. Date: Jan. 8, 2015

(65) Prior Publication Data
US 2016/0152263 A1    Jun. 2, 2016

(30) Foreign Application Priority Data
Jul. 4, 2013   (GB) .................................. 1312040.7

(51) Int. Cl.
*B62D 13/06*   (2006.01)
*B60T 8/17*    (2006.01)
(Continued)

(52) U.S. Cl.
CPC ............ *B62D 13/06* (2013.01); *B60T 8/1708* (2013.01); *B62D 15/025* (2013.01);
(Continued)

(58) Field of Classification Search
USPC ................. 701/41, 42, 43, 44, 523; 340/431
See application file for complete search history.

(56) References Cited

U.S. PATENT DOCUMENTS 5,247,442 A * 9/1993 Kendall ................ B62D 13/06
                                                280/426
6,292,094 B1 * 9/2001 Deng ..................... B62D 7/159
                                                340/431
(Continued)

FOREIGN PATENT DOCUMENTS

DE    10 2006 035021 A1    1/2008
DE    10 2007 032 720 A1   1/2009
(Continued)

OTHER PUBLICATIONS

Combined Search and Examination Report, GB 1312036.5, dated Jan. 22, 2014, 8 pages.

(Continued)

*Primary Examiner* — Jonathan M Dager
*Assistant Examiner* — Richard A Goldman
(74) *Attorney, Agent, or Firm* — Myers Bigel, P.A.

(57) ABSTRACT

The present invention relates to a vehicle control system (1) for controlling a vehicle (3) to facilitate reversing a trailer (5) coupled to the vehicle (3). The vehicle control system includes a processor (33) configured to receive a target trailer destination ($D_{TAR}$). The current position of the trailer (5) is determined by the processor (33). A target route (R) is then modelled to guide the trailer (5) from its current position to the target trailer destination ($D_{TAR}$). The processor (33) is configured to output a vehicle control signal to control the vehicle (3) to guide the trailer (5) along the target route (R). The invention also relates to a method of controlling a vehicle (3) to facilitate reversing a trailer (5).

12 Claims, 9 Drawing Sheets

(51) Int. Cl.
*B62D 15/02* (2006.01)
*G01C 21/34* (2006.01)

(52) U.S. Cl.
CPC ....... *B62D 15/028* (2013.01); *G01C 21/3407* (2013.01); *B60T 2201/10* (2013.01); *B60T 2230/08* (2013.01)

(56) References Cited

U.S. PATENT DOCUMENTS

| | | | |
|---|---|---|---|
| 6,854,557 B1 | 2/2005 | Deng et al. | |
| 7,225,891 B2 * | 6/2007 | Gehring | B62D 15/0285 180/14.2 |
| 2004/0130441 A1 * | 7/2004 | Lee | B60D 1/58 340/431 |
| 2005/0055138 A1 | 3/2005 | Lee et al. | |
| 2005/0074143 A1 | 4/2005 | Kawai | |
| 2005/0209762 A1 | 9/2005 | Lu et al. | |
| 2005/0270148 A1 | 12/2005 | Modawell et al. | |
| 2005/0285758 A1 | 12/2005 | Matsukawa et al. | |
| 2006/0020377 A1 | 1/2006 | Goetz et al. | |
| 2006/0111820 A1 | 5/2006 | Goetting et al. | |
| 2007/0027581 A1 | 2/2007 | Bauer et al. | |
| 2007/0198190 A1 | 8/2007 | Bauer et al. | |
| 2008/0095404 A1 | 4/2008 | Abercrombie et al. | |
| 2008/0312792 A1 * | 12/2008 | Dechamp | B62D 13/06 701/41 |
| 2009/0093928 A1 | 4/2009 | Getman et al. | |
| 2009/0236825 A1 * | 9/2009 | Okuda | B60D 1/36 280/477 |
| 2009/0243888 A1 | 10/2009 | Kawabata et al. | |
| 2009/0271078 A1 | 10/2009 | Dickinson | |
| 2009/0306854 A1 | 12/2009 | Dechamp | |
| 2010/0096203 A1 | 4/2010 | Freese et al. | |
| 2010/0262338 A1 | 10/2010 | Alguera | |
| 2012/0271515 A1 | 10/2012 | Rhode et al. | |
| 2013/0006472 A1 | 1/2013 | McClain et al. | |
| 2013/0158803 A1 * | 6/2013 | Headley | B62D 15/028 701/41 |
| 2013/0158863 A1 | 6/2013 | Skvarce et al. | |
| 2014/0005918 A1 * | 1/2014 | Qiang | B60D 1/245 701/300 |
| 2014/0058655 A1 * | 2/2014 | Trombley | B60R 1/00 701/300 |
| 2014/0058668 A1 * | 2/2014 | Trombley | G01C 21/20 701/523 |
| 2014/0222288 A1 | 8/2014 | Lavoie et al. | |
| 2014/0241584 A1 | 8/2014 | Elwart et al. | |
| 2014/0249691 A1 * | 9/2014 | Hafner | B62D 13/06 701/1 |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2015/0158527 A1 * | 6/2015 | Hafner | B60D 1/245 701/41 |
| 2015/0344010 A1 | 12/2015 | Kurtovic et al. | |
| 2016/0129939 A1 * | 5/2016 | Singh | B62D 13/06 701/41 |
| 2016/0152263 A1 * | 6/2016 | Singh | B60T 8/1708 701/41 |
| 2016/0153778 A1 | 6/2016 | Singh et al. | |
| 2017/0029024 A1 * | 2/2017 | Lavoie | B62D 13/06 |

FOREIGN PATENT DOCUMENTS

| | | |
|---|---|---|
| DE | 10 2011 120814 A1 | 6/2013 |
| EP | 2 011 701 A1 | 1/2009 |
| EP | 2 439 127 A1 | 4/2012 |
| EP | 2 634 071 A1 | 9/2013 |
| FR | 2 926 908 A1 | 7/2009 |
| GB | 2 398 049 A | 8/2004 |
| GB | 2 447 672 A | 9/2008 |
| GB | 2 513 393 A | 10/2014 |
| JP | 2002-326579 A | 11/2002 |
| JP | 2004-058829 A | 2/2004 |
| WO | WO 2012/103193 A1 | 8/2012 |
| WO | WO 2013/086249 A2 | 6/2013 |
| WO | WO 2014/019730 A1 | 2/2014 |

OTHER PUBLICATIONS

Combined Search and Examination Report, GB 1312038.1, dated Jan. 21, 2014, 7 pages.
Combined Search and Examination Report, GB 1312040.7, dated Jan. 22, 2014, 7 pages.
Combined Search and Examination Report, GB 1411930.9, dated Dec. 30, 2014, 8 pages.
Examination Report, GB 1411930.9, dated Nov. 16, 2015, 4 pages.
Fung et al., "Image Processing Application in Toll Collection," IAENG International Journal of Computer Science, 32:4, IJCS_32_4_15, Nov. 12, 2006, 6 pages.
Notification of Transmittal of the International Search Report and the Written Opinion, PCT/EP2014/064253, dated Mar. 3, 2015, 15 pages.
Notification of Transmittal of the International Search Report and the Written Opinion, PCT/EP2014/064270, dated Mar. 3, 2015, 14 pages.
Notification of Transmittal of the International Search Report and the Written Opinion, PCT/EP2014/064268, dated Oct. 9, 2014, 12 pages.
Search and Examination Report, GB 1312036.5, dated Sep. 11, 2014, 6 pages.
Patents Act 1977: Examination Report under Section 18(3), dated Oct. 9, 2017, 4 pp.
Communication pursuant to Article 94(3) EPC, EP Application No. 14 734 516.9, dated Nov. 27, 2017, 7 pp.
Communication pursuant to Article 94(3) EPC, EP Application No. 14 737 197.5, dated Nov. 28, 2017, 7 pp.

* cited by examiner

Trailer Path Diagram - Showing: Trailer centre of rotation, trailer hitch and vehicle front axle paths

SYSTEM FOR GUIDING TRAILER ALONG TARGET ROUTE DURING REVERSING MANEUVER

RELATED APPLICATIONS

This application is a 35 U.S.C. § 371 national stage application of PCT Application No. PCT/EP2014/064270, filed on Jul. 3, 2014, which claims priority from Great Britain Patent Application No. 1312040.7 filed on Jul. 4, 2013, the contents of which are incorporated herein by reference in their entireties. The above-referenced PCT International Application was published in the English language as International Publication No. WO 2015/001066 A9 on Jan. 8, 2015.

TECHNICAL FIELD

The present disclosure relates to a vehicle control system; a vehicle; and a method of controlling a vehicle.

BACKGROUND OF THE INVENTION

It is known from GB 2447672 to provide a computing unit to calculate a hitch angle between a trailer and a vehicle. The computing unit uses image data from three video cameras, fitted respectively to the rear of the vehicle and one on each door mirror, to track the position of a trailer-mounted marker to determine the position of the trailer relative to the vehicle. The computing unit can also predict a trailer target route and this is output to the driver on a display as guide lines overlaid onto a camera view.

At least in certain embodiments, the present invention relates to an improved control system.

SUMMARY OF THE INVENTION

Aspects of the present invention provide a system, a vehicle and a method as claimed in the appended claims.

According to a further aspect of the present invention there is provided a vehicle control system for controlling a vehicle to facilitate reversing a trailer coupled to the vehicle, the vehicle control system comprising a processor configured to:
  receive a target trailer destination;
  determine a current trailer position ; and
  model a target route from the current trailer position to the target trailer destination;
  wherein the processor is configured to output a vehicle control signal for controlling the vehicle to guide the trailer along the target route. The target trailer destination may be spatially displaced from the current trailer position and the controller may be operative to guide the trailer from its current position to the target destination. The target route may be modelled to enable the trailer to be reversed from the current trailer position to the target trailer destination. Rather than directly control the direction of travel of the vehicle or the trailer, the user may specify the target destination for the trailer and the processor may be configured to generate a target route. In particular, the processor may be configured to model the target route for the trailer to follow as it travels from its current position to the specified target destination.

The vehicle control signal can define the required steering angle inputs for the vehicle to guide the trailer along the target route. These could be output, for example to an audio or visual system, to prompt the user to make appropriate changes to the steering angle. Alternatively, the vehicle control signal can be output to steering control means for controlling the steering angle. The steering control means can, for example, comprise electronic power assisted steering (EPAS).

The current trailer position can define a current hitch angle (between the vehicle and the trailer) which determines an actual travel direction of the trailer. The current trailer position can be determined based on one or more sensor signals. The current trailer position can be measured by one or more sensors, such as a rotary sensor, provided at the coupling between the vehicle and the trailer for measuring a hitch angle of the trailer. The current trailer position could be determined by measuring the orientation of the trailer in relation to the vehicle, for example employing one or more ultrasonic sensors or one or more image sensors (for example disposed in a camera). The image data generated by said one or more image sensors could be analyzed to track the trailer, for example by identifying a feature of the trailer and/or a target provided on the trailer.

The target trailer destination can comprise position (i.e. spatial) data; and/or orientation (i.e. angular) data. The processor can determine the spatial and/or angular relationship between the current trailer position and the target trailer destination.

The target route can comprise one or more curves; and/or one or more linear sections. The target route can comprise only one reversing movement; or can comprise a sequence of forward and reversing movements. The user could specify whether a single reversing movement or multiple reversing movements are performed. The processor could be configured to output braking signals and/or acceleration signals for controlling the braking and acceleration respectively of the vehicle. Alternatively, the driver of the vehicle can control one or both of vehicle acceleration and braking. The processor can be configured to output driver prompts, for example to perform one or more of the following functions: accelerate, decelerate, change gear (such as select Drive or Reverse), engage parking brake and so on. The processor could be configured to inhibit the maximum speed of the vehicle, for example to 10 km/h.

The vehicle control signal can map a center point of the trailer to the target route. The vehicle control signal can be generated to maintain the center point of the trailer substantially coincident with the target route.

The target route can define a target trailer travel direction at each point along its length. The processor can be configured to control the vehicle to match the actual trailer travel direction to the target trailer travel direction as it travels along the target route. The vehicle control signal can control the steering angle of the vehicle to maintain the actual trailer travel direction at least substantially coincident with the target trailer travel direction. The actual trailer travel direction can thereby match the target trailer travel direction.

The processor can be configured to identify permissible target trailer destinations. The permissible target trailer destinations could be based on the identification of one or more obstructions. The processor can be configured to identify said permissible target trailer destinations based on one or more of the following: a maximum permissible hitch angle; the detected space available for the trailer and/or the vehicle; a detected terrain parameter (such as an incline or gradient). The processor can be configured to inhibit selection of an impermissible target trailer destination.

The processor can be configured to receive image data from one or more video cameras disposed on the vehicle and/or the trailer. The processor can comprise an image processing module for identifying obstruction(s) in video image data obtained from one or more optical cameras. The image processing module can be configured to identify one or more obstructions proximal to the trailer and/or the vehicle. Alternatively, or in addition, ultrasonic and/or laser sensor systems could be provided for detecting said obstruction(s). The processor could be configured dynamically to modify the target route if an obstruction is identified.

The processor could be configured to determine if there is sufficient space available to manoeuvre the trailer to the target trailer destination. Based on predefined trailer parameters (such as the trailer length, width and axle location), the processor can calculate a route corridor required to reverse the trailer. The imaging system can then identify obstacles proximal to the vehicle and/or the trailer and determine if there is sufficient space available to reverse the trailer. The processor can be configured to modify the target route of the trailer to remain within the calculated route corridor.

The processor can be configured to output the target trailer destination and/or the target route to a display. The target trailer destination and/or the target route could, for example, be overlaid onto a video image from one or more of said video camera(s).

The target trailer destination can be specified by a user. A human machine interface can be provided for specifying the target trailer destination. The human machine interface can, for example, comprise a display device, such as an LCD screen. An input means can be provided for the human machine interface. The input means can, for example, comprise one or more of the following: a touchscreen, a capacitive sensor, a joystick, a rotary wheel, a trackball, voice recognition, gesture recognition, and eye tracking. A graphical image can be displayed on the display device to represent the target trailer destination. The position and/or the orientation of the graphical image can be controlled using the input means. The position and/or the orientation of the graphical image can be converted to data to identify said target trailer destination and output to the processor.

A scaling function can be applied to the graphical image as it is moved around the screen. The scaling function has particular application when the graphical image is displayed in a perspective view, for example as an overlay onto a video image from a camera disposed on the vehicle or the trailer.

The graphical image can represent a footprint of the trailer, for example representing an outline of the trailer on the ground. The graphical image could, for example, comprise a rectangle. Alternatively, the graphical image could provide a 3-dimensional representation of the trailer, for example a vector image or a rendering of the trailer. The graphical image can provide a scale representation of the trailer.

The vehicle control signal can comprise a steering control signal for controlling a steering angle of the vehicle.

According to a still further aspect of the present invention there is provided a vehicle control system for controlling a vehicle to facilitate reversing a trailer coupled to the vehicle, the vehicle control system comprising a processor configured to:
generate a target route from the current trailer position to the target trailer destination;
wherein the processor is configured to generate the target route by modifying a pre-defined path based on a determined angular offset and/or positional offset between the current trailer position and the target trailer destination.

The pre-defined path can comprise first and second curves. The first and second curves can be arranged in an S-shape. The processor can be configured to increase or decrease an included angle of one or both of said first and second curves in dependence on said angular offset. The processor can be configured to define a minimum radius of curvature in the target route based on a jack-knife angle of the trailer.

According to a further aspect of the present invention there is provided a vehicle comprising a vehicle control system of the type described herein.

According to a still further aspect of the present invention there is provided a method of controlling a vehicle to reverse a trailer to a specified target trailer destination, the method comprising:
receiving an input to define a target trailer destination;
determining a current trailer position;
modelling a target route from the current trailer position to the target trailer destination; and
outputting a vehicle control signal for controlling the vehicle to guide the trailer along the target route.

According to a yet further aspect of the present invention there is provided a method of generating a target route for reversing a trailer from a current position to a target destination; the method comprising:
modifying a pre-defined path based on a determined angular offset and/or positional offset between the current position and the target destination to generate the target route. The pre-defined path can be stored in memory. The pre-defined path can, for example, comprise first and second curves, for example arranged in an S-shape. The method can comprise applying a minimum radius of curvature to the target route, the minimum radius of curvature being based on the jack-knife angle of the trailer.

The methods described herein can each be computer-implemented, for example on a computational apparatus comprising one or more microprocessors. According to a yet further aspect of the present invention there is provided a computer program product comprising a computer readable storage medium including computer readable program code, where the computer readable program code when executed on a computer causes the computer to perform the method(s) described herein.

The term processor used herein is to be understood as covering both single processors and multiple processors.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

A vehicle control system 1 for assisting with the reversing of a vehicle 3 and a trailer 5 in accordance with an aspect of the present invention will now be described with reference to FIGS. 1 to 9.

The vehicle control system is operable to facilitate reversing of the trailer 5 when it is coupled to the vehicle 3 (the combination of the vehicle 3 and the trailer 5 can be referred to as 'a rig'). More specifically, the vehicle control system 1 is configured to control the steering of the vehicle 3 such that the trailer 5 is reversed to a target trailer destination $D_{TAR}$ specified by the user. In the present embodiment, the operation of the throttle and brakes of the vehicle 3 are controlled by the user, but these control functions could be automated.

Figure 1:
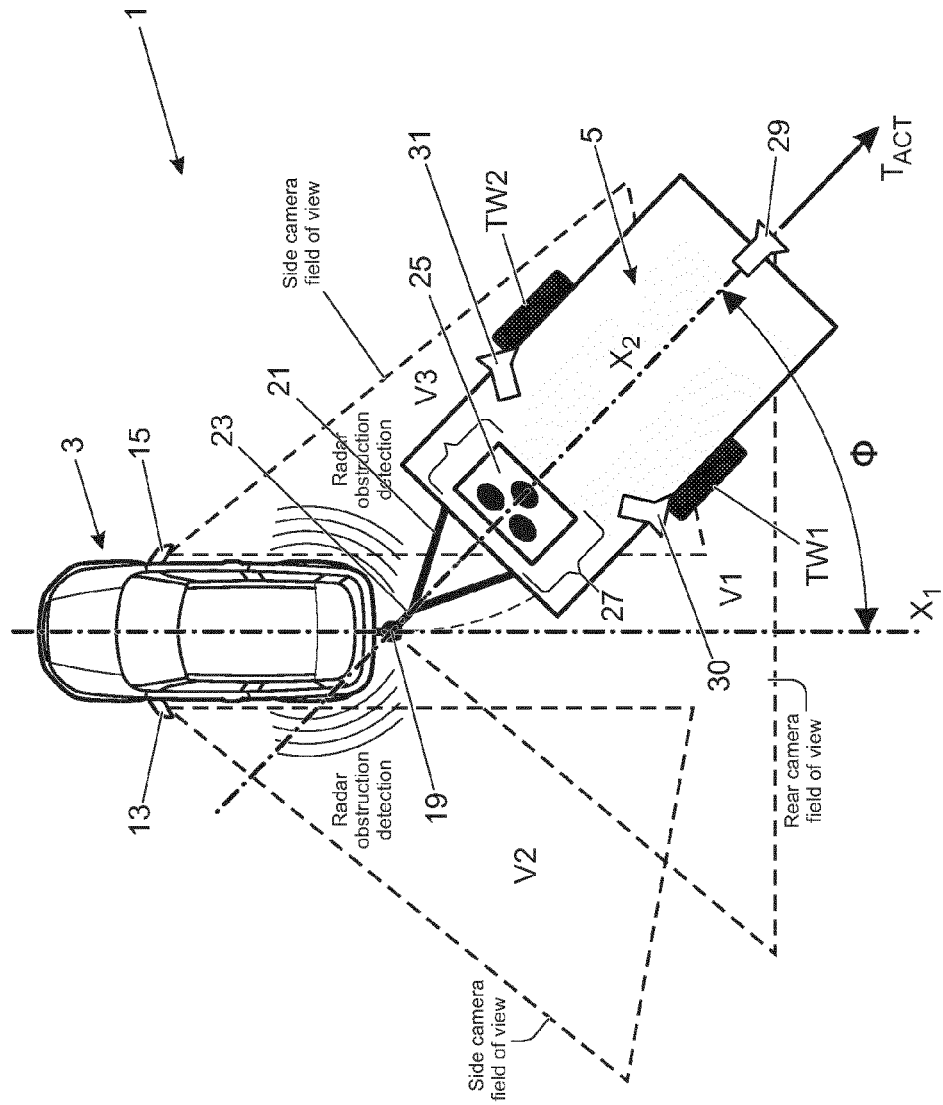
FIG. 1 shows a plan view of a trailer coupled to a vehicle incorporating a vehicle control system in accordance with an embodiment of the present invention.
Figure 2:
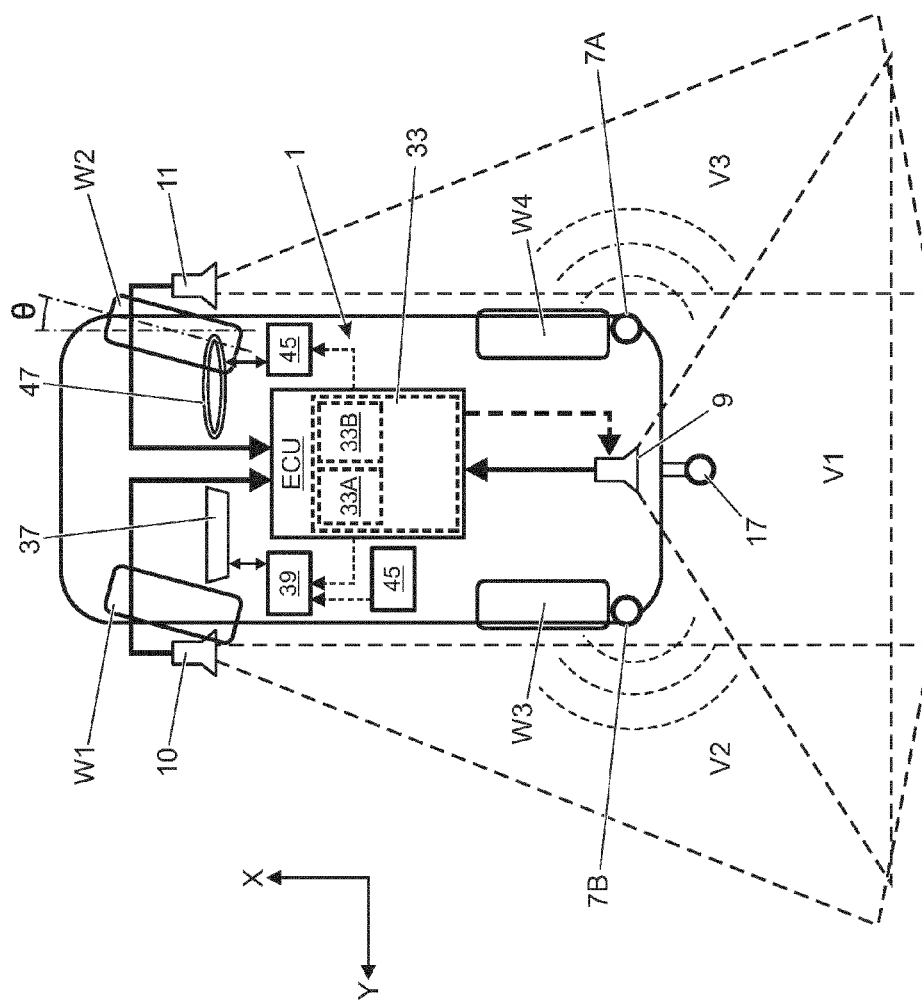
FIG. 2 shows a schematic representation of the vehicle and the control system in accordance with an embodiment of the present invention.
Figure 3:
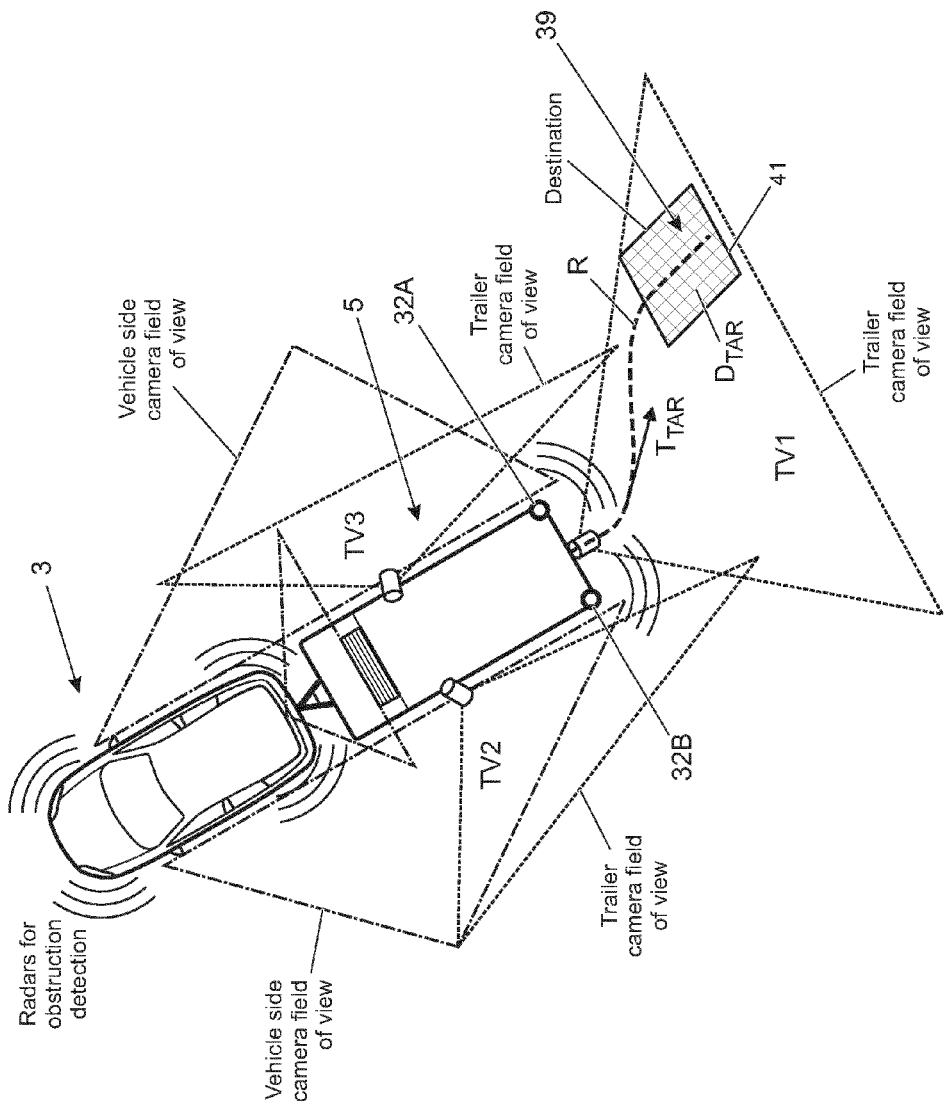
FIG. 3 shows a plan view of the vehicle and trailer with the target trailer destination and the target route indicated.
Figure 4:
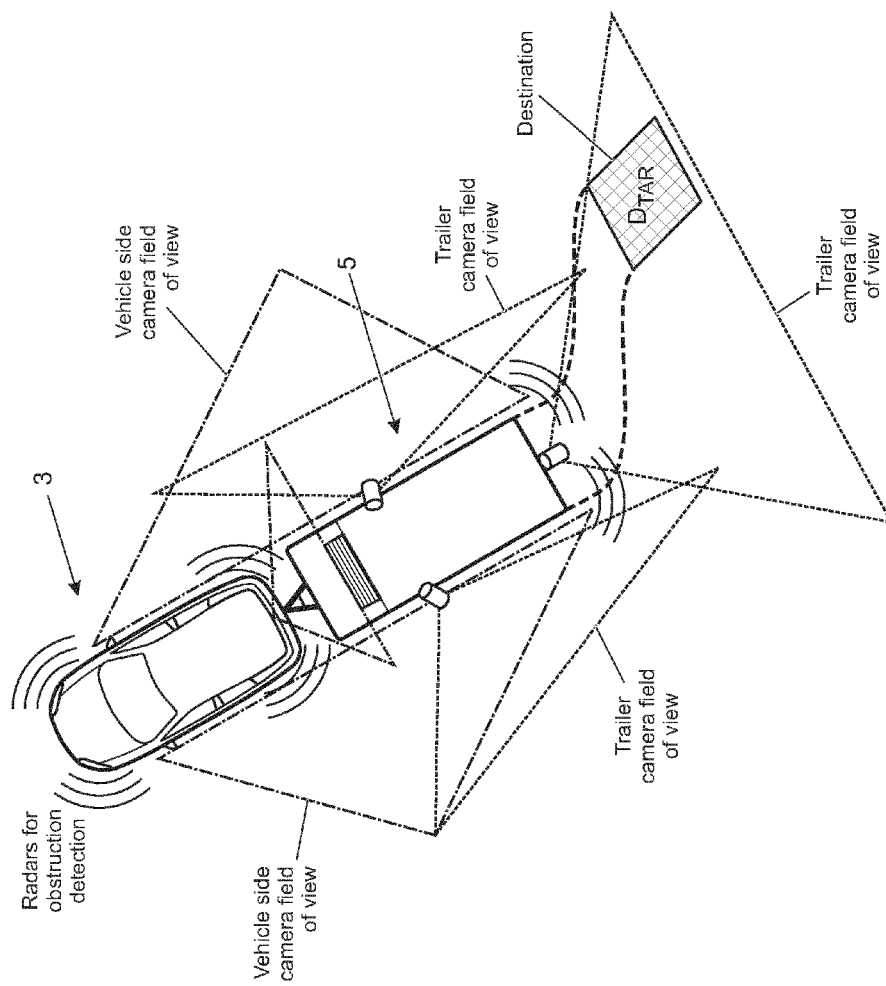
FIG. 4 shows a plan view of the vehicle and trailer shown in FIG. 3 with the path to be followed by the wheels of the trailer indicated.

A plan view of the vehicle 3 and the trailer 5 is shown in FIG. 1. The vehicle 3 has two front wheels W1, W2 and two rear wheels W3, 4. As illustrated in FIG. 2, the front wheels W1, W2 of the vehicle 3 are steerable in conventional manner to define a steering angle θ. The trailer 5 has two wheels TW1, TW2 which are not steerable.

As shown in FIGS. 1 and 2, the vehicle 3 is provided with a vehicle imaging system comprising a centrally mounted rear vehicle camera 9; and left and right side vehicle cameras 10, 11 mounted in respective wing mirrors 13, 15. The vehicle cameras 9, 10, 11 are optical cameras arranged to face to the rear of the vehicle 3 and their fields of view V1, V2, V3 are illustrated by dashed triangles. The vehicle 3 optionally also comprises an obstruction detection system, for example side radar systems 7A, 7B for detecting the presence of an obstruction in the rear three quarters position of the vehicle 3.

A tow hitch 17 is mounted to the vehicle 3 for coupling to a trailer coupling 19 mounted to the trailer 5. The tow hitch 17 is an upwardly projecting tow ball in the present embodiment. The trailer coupling 19 is mounted to a hitch frame 21 disposed at the front of the trailer 5. In the present embodiment, the hitch frame 21 is an A-frame having a front apex 23 to which the trailer coupling 19 is mounted. A target 25 is mounted to a front face 27 of the trailer 5 to enable the position of the trailer 5 relative to the vehicle 3 to be determined, as described herein. The target 25 is a visible image comprising three circles arranged in a triangular formation. It will be appreciated that the present invention can be implemented with other targets 25, for example comprising different symbols/images or non-visible targets.

The trailer 5 is provided with a trailer imaging system comprising a centrally mounted rear trailer camera 29; and left and right side trailer cameras 30, 31 mounted on respective sides of the trailer 5. The trailer cameras 29, 30, 31 are optical cameras arranged to provide video images of the area around the trailer 5 which may otherwise be obscured from view. The fields of view TV1, TV2, TV3 of the trailer cameras 29, 30, 31 are illustrated by dashed triangles in FIGS. 3 and 4. The trailer 5 optionally also comprises an obstruction detection system, for example parking sensors 32A, 32B, for detecting the presence of obstructions at the rear of the trailer 5. The image data from the trailer cameras 29, 30, 31 and/or obstruction data from the obstruction detection system is transmitted to the vehicle 3 over either a wired connection or a wireless communication channel.

The vehicle control system 1 comprises an electronic control unit (ECU) having an electronic processor 33, as shown schematically in FIG. 2. The processor 33 comprises image processing means in the form of an image processing module 33A for analysing the image data. The vehicle cameras 9, 10, 11 and the trailer cameras 29, 30, 31 each output image data to the image processing module 33A for analysis. In use, the image processing module 33A analyses the image data from the vehicle cameras 9, 10, 11 to identify the target 25 to determine the current position of the trailer 5 in relation to the vehicle 3. In particular, the image processing module determines the current orientation of the trailer 5 relative to the vehicle 3. Moreover, the image processing module 33A analyses the image data from the trailer cameras 29, 30, 31 to identify obstructions proximal to the trailer 5. The image processing module 33A can optionally analyse the image data from the vehicle cameras 9, 10, 11 to identify obstructions proximal to the vehicle 3 and trailer 5.

Figure 9:
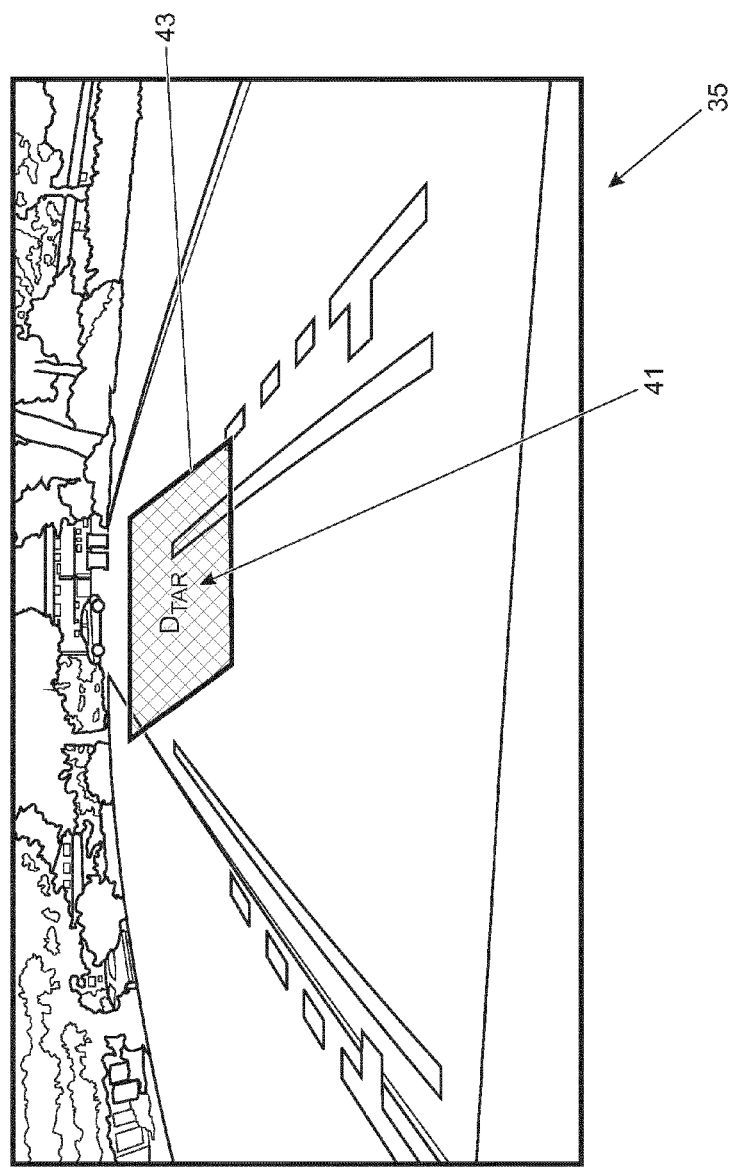
FIG. 9 shows a display image from the rear camera on the trailer with a target trailer destination indicated.

The image processing module 33A is configured to multiplex the images from the trailer cameras 29, 30, 31 to generate a composite image 35 showing a panoramic view to the rear of the trailer 5, as shown in FIG. 9. The resulting composite image 35 can be output to a display screen 37 to be viewed by the user substantially in real-time. The display screen 37 can be provided in an instrument cluster or in an infotainment console. The image data from the vehicle cameras 9, 10, 11 and the trailer cameras 29, 30, 31 could be combined to provide a plan view of the vehicle 3 and the trailer 5 (as if viewed from a position above the vehicle 3 and the trailer 5).

The processor 33 further comprises vehicle/trailer guidance means in the form of a guidance module 33B. The guidance module 33B is provided to assist with guiding the trailer 5 when the vehicle 3 and the trailer 5 are being reversed together. In particular, the guidance module 33B is configured to output a control signal for controlling the steering angle θ of the front wheels W1, W2 of the vehicle 3 to guide the trailer 5 along a target route R. The target route R is generated by the guidance module 33B to guide the trailer 5 from its current position to a target destination $D_{TAR}$ specified by the user. The target route R is illustrated by a dashed line in FIG. 3 and the path to be followed by the wheels W1, W2 of the trailer 3 are represented by arcuate lines in FIG. 4.

The vehicle control system 1 comprises a human machine interface (HMI) module 39. The HMI module 39 is coupled to the display screen 37 and is configured to superimpose a graphical image 41, representing the target destination $D_{TAR}$ of the trailer 5, onto the composite image 35. In the present embodiment the graphical image 41 comprises a rectangle 43 which represents the footprint of the trailer 5. The graphical image 41 is sized to provide a scale representation of the trailer 5 within the composite image 35. To provide an accurate representation of the trailer 5, the trailer dimensions can be specified by the user and stored in a data file accessible to the HMI module 39. In the present embodiment a portion of the graphical image 41 is semi-transparent to reduce obfuscation of objects in the composite image 35. It will be appreciated that the present invention is not limited to the display of a rectangle 43 and other graphical images 39 can be used to represent the trailer 5.

The HMI module 39 is coupled to input means 45 in the form of a touch screen and a rotary dial. The input means 45 can be operated by the user to position the graphical image 41 within the composite image 35. The user can thereby position the graphical image 41 to specify the target destination $D_{TAR}$ for the trailer 5, typically corresponding to a location where the trailer 5 is to be parked. The input means 45 can optionally also enable the user to define the orientation of the trailer 5 in relation to the vehicle 3, for example by adjusting the angular orientation of the rectangle 43.

The HMI module 39 performs a scaling operation on the graphical image 41 to adjust its size based on its position within the composite image 35, for example to increase/decrease its size in dependence on its virtual position in relation to the camera generating the video image. The graphical image 41 can optionally also be modified to alter its perspective, for example to simulate foreshortening, as it is moved within the composite image 35. The graphical image 41 can thereby provide an accurate representation of the size of the trailer 5 within the composite image 35. The processor 33 could be configured to identify areas or regions which are unsuitable for positioning the trailer 5. The HMI module 39 can be configured to represent any such areas as an overlay on the composite image 35. Alternatively, or in addition, the HMI module 39 can be configured to prevent the graphical image 41 being moved to locations identified by the processor 33 as being unsuitable for positioning the trailer 5. For example, the processor 33 could determine that a region displayed in the composite image 35 is unsuitable due to the detection of one or more obstructions by the image processing module 33A. Alternatively, or in addition, the processor 33 could assess one or more terrain parameters, such as incline or gradient, to identify unsuitable regions for the trailer 5. The terrain parameters could be assessed from the image data derived from the vehicle cameras 9, 10, 11 and/or the trailer cameras 29, 30, 31. Alternatively, or in addition, one or more of the following types of sensor could be employed to monitor the terrain: ultrasonic sensors/cameras, laser scanners and radar. The resulting terrain data could be used to restrict selection of the target destination $D_{TAR}$; and/or control vehicle operating parameters, for example to engage four wheel drive or to select a low transfer range; and/or request user confirmation of the selected target destination $D_{TAR}$.

The guidance module 33B is configured to generate the target route R to guide the trailer 5 from its current location to the target destination $D_{TAR}$ specified by the user. The target route R defines a target trailer travel direction $T_{TAR}$ for guiding the trailer 5 from its current position to the target destination $D_{TAR}$. The target route R can comprise rectilinear and/or curved sections. The target route R is arranged coincident with a midpoint of the trailer 5 in its current position. The current position of the trailer 5 is monitored compared to the originally calculated target route R. Small deviations are managed within the vehicle control system 1. Larger deviations can trigger a recalculation of the target route R. If the target destination $D_{TAR}$ becomes unachievable from the current position, the user is alerted and a corrective manoeuvre is suggested (for example travel forward a short distance).

Figure 5:
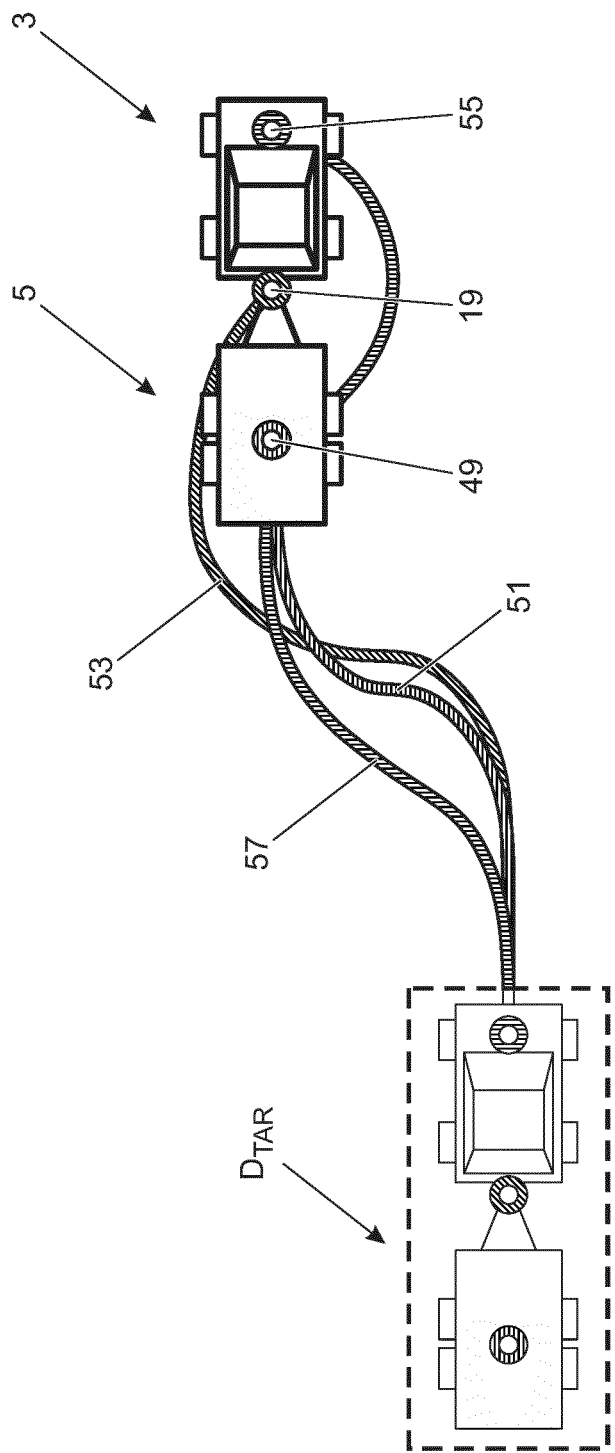
FIG. 5 illustrates the routes traced by the rotational centers of the vehicle and the trailer and the trailer hitch.

The user positions the graphical image 41 within the composite image 35 to define the target destination $D_{TAR}$ of the trailer 5. The guidance module 33B determines the target route R between the current trailer position and the specified target destination $D_{TAR}$. As illustrated in FIG. 5, the vehicle steering angle θ is controlled such that a center of rotation 49 of the trailer 5 defines a first path 51 which at least substantially matches the target route R. The trailer hitch 19 defines a second path 53 as the trailer 5 follows the target route R; and a center of rotation 55 of the vehicle 3 defines a third path 57 as the trailer 5 follows the target route R. In an alternate embodiment, the guidance module 33B could be configured to generate the second or third paths 53, 55 to guide the trailer 5 to the target destination $D_{TAR}$ and to control the vehicle steering angle θ to follow said second or third paths 53, 55. The target route R is a straight line if the target destination $D_{TAR}$ is in line with the trailer 5. Otherwise, the target route R comprises a curve based on the geometry of the vehicle and trailer and location of the target destination.

Figure 6A:
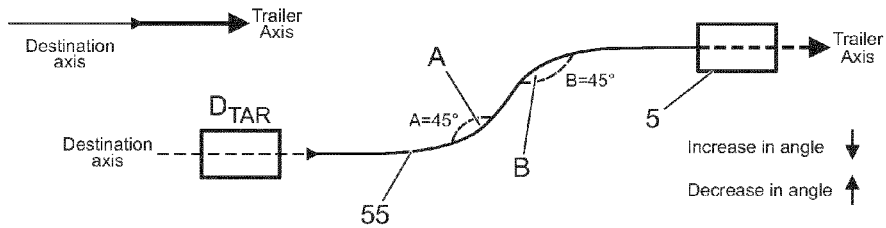
FIGS. 6A-6E illustrate the generation of the target route in different scenarios.

With reference to FIGS. 6A-6E, the guidance module 33B implements a geometric algorithm to generate the target route R. The guidance module 33B utilises the angular offset between the current trailer longitudinal axis X2 and the target trailer longitudinal axis $X2_{TAR}$; and the lateral offset between the current trailer position and the target destination $D_{TAR}$ (measured perpendicular to the trailer longitudinal axis X2. As shown in FIG. 6A, the algorithm defines a default S-shaped path 55 (shown in phantom in FIGS. 6B-6E) comprising first and second curves A, B. The first curve A defines a first included angle of +45°; and the second curve B defines a second included angle of −45°. If required, a scaling function (along an X axis and/or a Y axis) is applied to the S-shaped path 55 to link the actual longitudinal axis X2 of the trailer 5 to the target longitudinal axis $X2_{TAR}$ of the trailer 5 when it is in the target destination $D_{TAR}$. The guidance module 33B can optionally be configured to define a minimum radius of curvature for the first and second curves A, B to ensure that the hitch angle φ does not equal or exceed the jack-knife angle.

The S-shaped path 55 is positioned to link the actual longitudinal axis X2 of the trailer 5 to the target longitudinal axis $X2_{TAR}$. A scaling function and/or a rotation function can be applied to the S-shaped path 55 depending on the position and/or orientation of the target destination $D_{TAR}$ in relation to the current trailer position. The S-shaped path 55 is then modified by adjusting the included angle of either the first curve A or the second curve B in dependence on the angular offset between the actual longitudinal axis X2 and the target longitudinal axis $X2_{TAR}$.

In the present embodiment, the guidance module 33B identifies which of the first and second curves A, B opens onto the side of the S-shaped path 55 to which the target longitudinal axis $X2_{TAR}$ is oriented. The guidance module 33B then modifies the included angle of the identified curve A, B corresponding to the angular offset between the actual longitudinal axis X2 and the target longitudinal axis $X2_{TAR}$. This technique will now be described with reference to FIGS. 6B-6E.

Figure 6B:
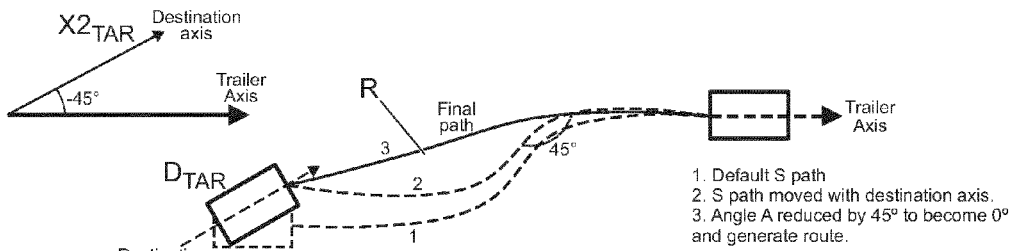

In the scenario illustrated in FIG. 6B, the target longitudinal axis $X2_{TAR}$ is offset by −45° and is directed to the left side of the S-shaped path 55. Accordingly, the included angle of the first curve A (which opens to the left side of the S-shaped path 55) is reduced by 45°. As the pre-defined included angle is +45°, the first curve A is effectively removed from the S-shaped path 55 leaving only the second curve B. The resulting modified curve is defined as the target route R.

Figure 6C:
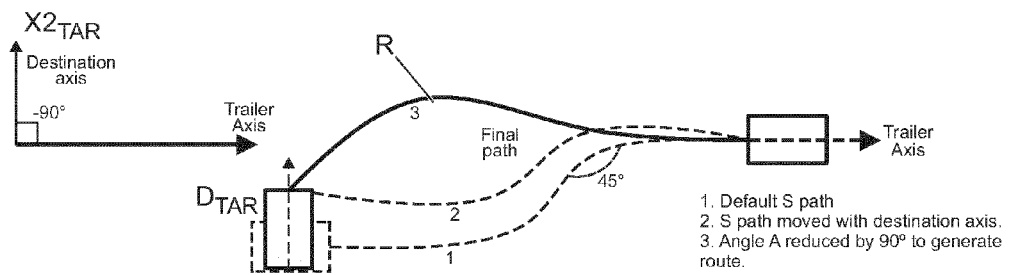

In the scenario illustrated in FIG. 6C, the target longitudinal axis $X2_{TAR}$ is offset by −90° and is directed to the left side of the S-shaped path 55. Accordingly, the included angle of the first curve A is reduced by 90° to define an included angle of −45°, thereby reversing the curvature direction of the first curve A. The resulting modified curve is defined as the target route R.

Figure 6D:
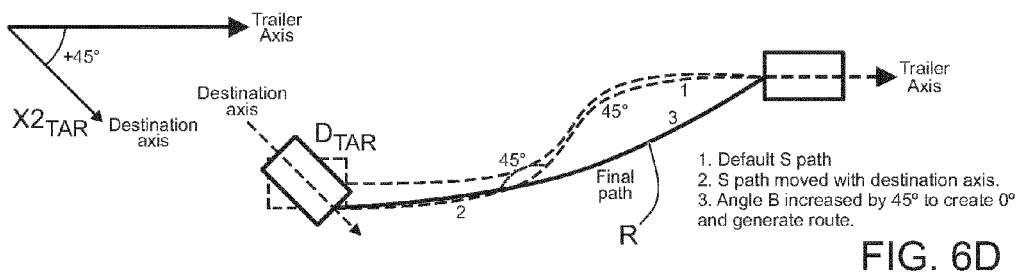

In the scenario illustrated in FIG. 6D, the target longitudinal axis $X2_{TAR}$ is offset by +45° and is directed to the right side of the S-shaped path 55. Accordingly, the included angle of the second curve B (which opens to the right side of the S-shaped path 55) is increased by 45°. As the pre-defined included angle is −45°, the second curve B is effectively removed from the S-shaped path 55 leaving only the first curve A. The resulting modified curve is defined as the target route R.

Figure 6E:
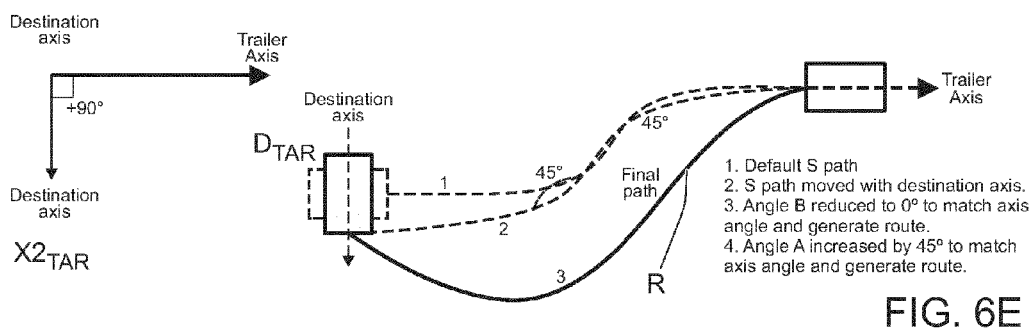

In the scenario illustrated in FIG. 6E, the target longitudinal axis $X2_{TAR}$ is offset by +90° and is directed to the right side of the S-shaped path 55. Accordingly, the included angle of the second curve B is increased. However, to compensate for the lateral offset of the trailer 5, the second curve B is increased by 45° to 0°, thereby removing the second curve B. The first curve A is also increased by 45° to 90° (again to compensate for the lateral offset of the target destination $D_{TAR}$). The resulting modified curve is defined as the target route R.

Figure 7A:
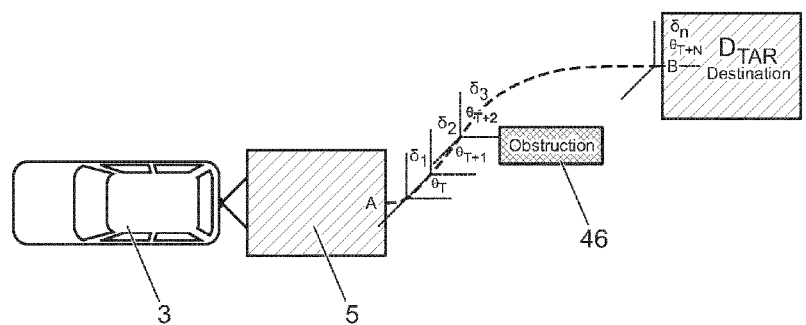
FIGS. 7A and 7B illustrate the control strategy for guiding the trailer along the target route.
Figure 7B:
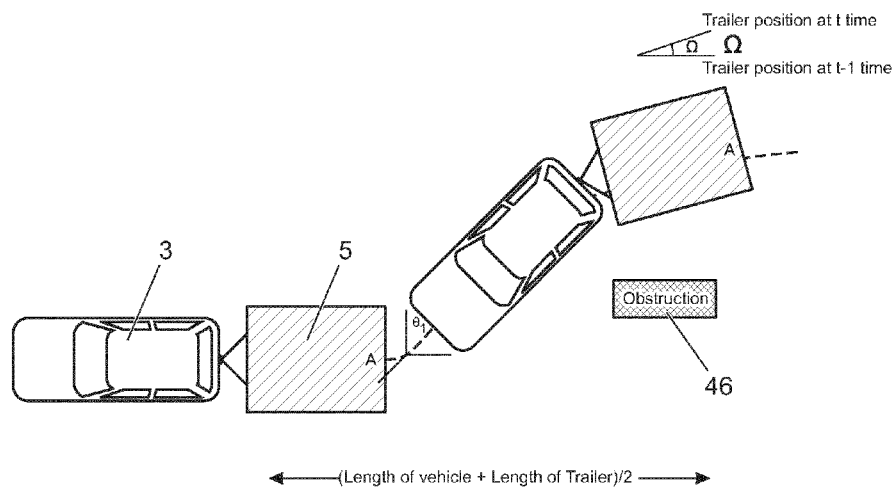

In a second process step, the vehicle control system 1 attempts to identify the presence of any obstructions (denoted generally by the reference numeral 46 in FIGS. 7A and 7B). Typical obstructions include kerbs, walls, vehicles, etc. The vehicle control system 1 can optionally also determine terrain parameters, for example to detect a metalled surface indicating a road; and/or terrain features, for example gradient changes. As described herein, the obstructions 46 can be identified by the image processing module 33A and/or other detection systems. The guidance module 33B modifies the target route R generated in the first process step. By way of example, the guidance module 33B will give a higher priority to a route which guides the trailer 5 to the target destination $D_{TAR}$ whilst remaining on a road than a route which provides the shortest achievable path.

With reference to FIGS. 7A and 7B, in order to guide the trailer 5 the guidance module 33B calculates the required vehicle steering angle θ to achieve the appropriate trailer angle δ at intervals x, 2x, 3x . . . nx along the route R, where x equals half the combined length of the vehicle 3 and the trailer 5. The interval distance x is configurable and can be reduced, for example to ¼ the combined length of the vehicle 3 and the trailer 5 to provide improved accuracy, albeit at the expense of increased processing load on the processor 33 The trailer angle δ is the angle between an expected angular position of the trailer 5 at a particular interval and the position of the trailer 5 before the manoeuvre starts. Once the guidance module 33B has calculated the required trailer angle δ at the calculating points (defined by the n intervals along the target route R), the trailer angles $δ_n$, $δ_{n+1}$ at adjacent calculation points are compared to determine the difference between the trailer hitch angles $φ_n$, $φ_{n+1}$ at adjacent interval points.

If the hitch angle φ can be achieved between the two calculation points, the guidance module 33B stores the values in memory and, during the manoeuvre, accesses the stored values after each interval to set the next interval value as the desired hitch angle φ. If the guidance module 33B detects a large deviation between the present hitch angle φ and the expected hitch angle φ it restarts the calculation to avoid failure.

If the hitch angle φ between the two calculation points cannot be achieved (for example based on the maximum steering angle θ of the vehicle and the trailer geometry), the guidance module 33B compares the required hitch angle $φ_n$, $φ_{n+1}$ between first and second intervals x to establish if this hitch angle φ can be achieved while considering surrounding conditions. If the comparison of the hitch angle $φ_n$, $φ_{n+1}$ between the first and second intervals x is possible, the guidance module 33B stores the values in memory and, during the manoeuvre, accesses the stored values after each interval to set the next interval value as the desired hitch angle φ. If the guidance module 33B fails to achieve the required hitch angle φ for four (4) consecutive interval points (i.e. x to 4x), an alternative target route R is calculated while considering space requirement and the surrounding obstructions 46. If the guidance module 33B is unable to establish a viable alternative target route R, the guidance module 33B calculates an alternate position between failure points identified by means of driving forward in the available space to complete the manoeuvre. During the route calculation the guidance module 33B determines whether the hitch angle φ change between two intervals can be achieved. If the hitch angle φ cannot be achieved then the calculation needs to check if the hitch angle φ change calculated in alternative routes in two previous and two subsequent intervals can be achieved. If this fails then the calculation starts again or requests an initial drive forwards to reduce the rate of change of hitch angle. A forward shuffle could also be requested mid-manoeuvre.

The angular change Ω in the trailer angle δ at intervals along the target route R is illustrated in FIG. 7B. The angular change Ω is illustrated with reference to a first time t and a second time t+1, but the calculation of the required angle change is based on distance rather than time.

As described herein, the steering angle θ of the vehicle 3 is controlled to maintain the actual travel direction $T_{ACT}$ of the trailer 5 substantially coincident with the target trailer travel direction $T_{TAR}$ during the reversing manoeuvre along said target route R. The guidance module 33B can control the steering angle θ of the front wheels W1, W2 to guide the trailer 5 along the target travel direction $T_{TAR}$.

The control algorithm for generating a control signal to guide the vehicle 3 along the target route R will now be described with reference to FIG. 9. The vehicle 3 has a first longitudinal axis X1 and the trailer 5 has a second longitudinal axis X2. The angular offset between the first and second longitudinal axes X1, X2 is referred to as the hitch angle φ. During reversing, the trailer 5 travels in a direction $T_{ACT}$ corresponding to the hitch angle φ (unless the hitch angle φ exceeds a jack-knife angle for the trailer 5, as described herein).

The image processing module 33A calculates the hitch angle φ with reference to the target 25 and outputs a hitch angle signal to the guidance module 33B. When reversing, the guidance module 33B calculates the required steering angle θ based on the following equation:

$$θ_{t+1} = θ_t + \min(\max(k(φ_{req} - φ_{cur}), -α), α)$$

Where: $θ_{t+1}$ and $θ_t$ are the steering angles of the vehicle 3 at frame t+1 and t (auto steering command from the algorithm and current steering from the CAN respectively);
$φ_{req}$ and $φ_{cur}$ are the requested and current hitch angles;
α is the maximum steering offset value; and k is a constant multiplier.

Figure 8:
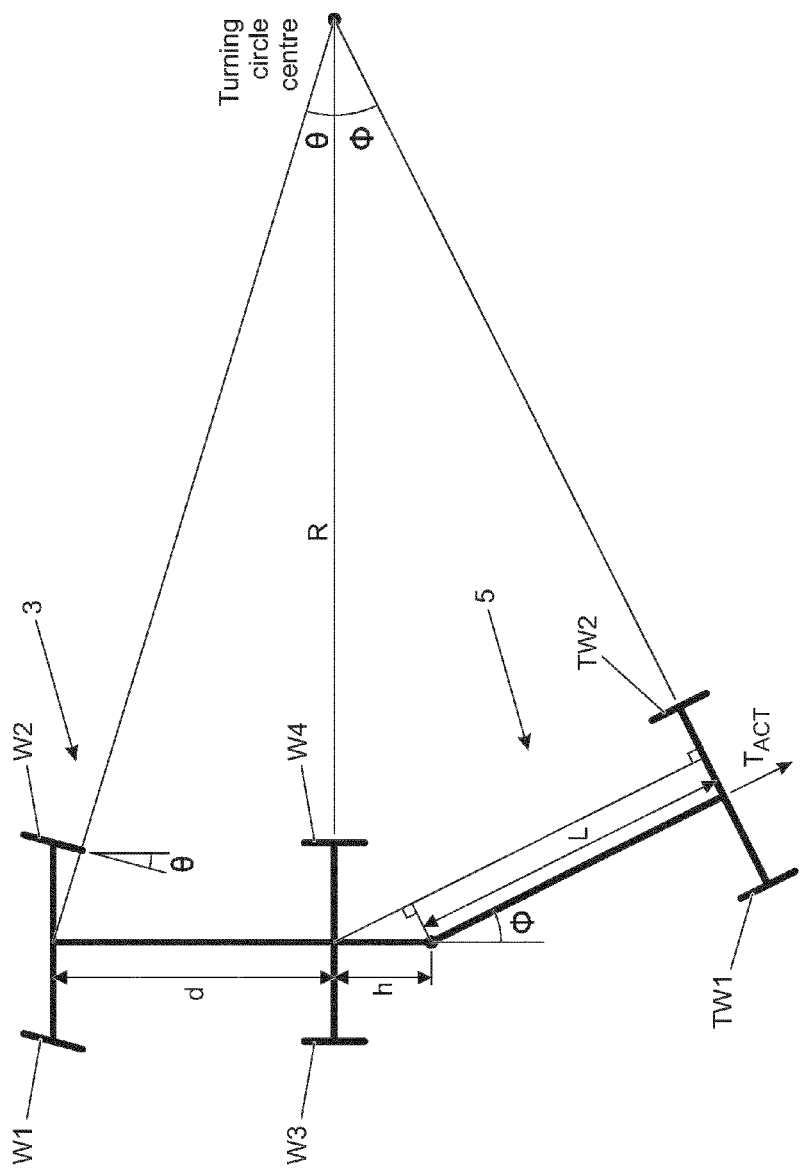
FIG. 8 illustrates the vehicle and trailer dimensions and associated nomenclature.

The value of the gain k can be calculated based on the relationship between θ and φ, as shown in FIG. 8. When the trailer hitch length L plus the tow bar offset of the vehicle h is equal to the vehicle wheelbase d, then the relationship between θ and φ is one (1) for small angles and so the gain k can be set to a value of one (1). The gain k can therefore be calculated based on the following equation:

$$k = \frac{L+h}{d}$$

Where: L is the hitch length of the trailer 5;
h is the tow bar offset of the vehicle 3;
d is the wheelbase of the vehicle 3;

The gain k thereby compensates for the fact that longer trailers take longer to reach the requested hitch angle φ.

The guidance module 33B is configured to calculate a maximum permissible hitch angle $φ_{MAX}$. If the hitch angle φ exceeds the maximum permissible hitch angle $φ_{MAX}$ (which in the present embodiment is the jack-knife angle of the trailer 5), it is no longer possible to reduce the hitch angle φ by continuing to reverse (i.e. the trailer 5 has jack-knifed). If the detected hitch angle φ is equal to or exceeds the calculated jack-knife angle, the vehicle control system 1 will advise the user to drive forward until it determines that the trailer angle δ at the next interval is achievable while considering space and obstructions. With reference to FIG. 8, the guidance module 33B calculates the maximum permissible hitch angle $φ_{MAX}$ by applying the following set of equations:

$$R = \frac{d}{\tan(\theta)}$$

$$\phi = \cos^{-1}\left(\frac{-Lh + R\sqrt{R^2 + h^2 - L^2}}{R^2 + h^2}\right) \text{ for positive } \theta$$

$$\phi = -\cos^{-1}\left(\frac{-Lh - R\sqrt{R^2 + h^2 - L^2}}{R^2 + h^2}\right) \text{ for negative } \theta$$

Where: R is the turning radius;
θ is the steering angle of the vehicle 3;
d is the wheelbase of the vehicle 3;
h is the tow bar offset of the vehicle 3;
L is the hitch length of the trailer 5;

The wheelbase d, the tow bar offset h and the maximum steering angle $θ_{MAX}$ of the vehicle 3 are defined for the vehicle 3. The hitch length L of the trailer 5 is entered during trailer setup by the user (or can be determined during a calibration exercise). The guidance module 33B outputs a maximum hitch angle signal to indicate the maximum permissible hitch angle $φ_{MAX}$ for the current steering angle θ. The guidance module 33B is configured to inhibit the trailer travel direction $T_{ACT}$ to values which are less than the maximum permissible hitch angle $φ_{MAX}$. A minimum radius of curvature of the target route R can be defined to ensure that the trailer travel direction $T_{ACT}$ is less than or equal to the maximum permissible hitch angle $φ_{MAX}$.

The guidance module 33B calculates the initial required steering angle θ to achieve the desired hitch angle φ, then iteratively calculates the required steering angle θ and hitch angle φ. In use, the guidance module 33B is configured to output a steering control signal operative to control the steering angle θ of the front wheels W1, W2 to adjust the hitch angle φ, thereby modifying the actual trailer travel direction $T_{ACT}$. Specifically, the guidance module 33B adjusts the steering angle θ (which can be positive or negative in relation to a reference point) to increase or decrease the hitch angle φ. The actual trailer travel direction $T_{ACT}$ can thereby be matched to the target trailer travel direction $T_{TAR}$ required to follow the target route R. The hitch angle signal is updated at least substantially in real time and the guidance module 33B makes corresponding real time adjustments to the steering control signal. The guidance module 33B controls the hitch angle φ so that the difference between the actual trailer travel direction $T_{ACT}$ and the target trailer travel direction $T_{TAR}$ is at least substantially zero. A tolerance of +/−0.5° between the actual trailer travel direction $T_{ACT}$ and the target trailer travel direction $T_{TAR}$ provides a good result.

The steering angle control signal is output to an electronic power assisted steering (EPAS) module 45 to control the angle of a steering wheel 47 to provide a required steering angle θ for the front wheels W1, W2. The EPAS module 45 automatically adjusts the angular orientation of the steering wheel 47 to provide the appropriate steering angle θ at the front wheels W1, W2 to control the vehicle 3 to match the actual trailer travel direction $T_{ACT}$ with the target trailer travel direction $T_{TAR}$.

In use, the user operates the HMI module 39 to position the graphical image 41 at the target destination $D_{TAR}$ for the trailer 5, as illustrated in FIG. 9. Specifically, the user operates the input means 45 to guide the graphical image 41 to the desired location on the video image 35. The input means 45 can be operated to adjust the position and/or orientation of the target destination $D_{TAR}$ for the trailer 5. The user then confirms the target destination $D_{TAR}$ for the trailer 5.

The image processing module 33A analyses the image data from the vehicle cameras 9, 10, 11 to identify the target 25 on the trailer 5 and to determine the current position of the trailer 5 in relation to the vehicle 3. The guidance module 33B then models a target route R for the trailer 5 from its current position to the target trailer destination $D_{TAR}$. A vehicle control signal is output by the guidance module 33B to the EPAS module 45 to adjust the steering angle θ to control the vehicle 3 to match the actual travel direction $T_{ACT}$ of the trailer 5 with the target travel direction $T_{TAR}$. The HMI module 39 can optionally output instructions to prompt the user to select the appropriate drive gear and to operate the vehicle brakes and throttle. The EPAS module 45, in dependence on the vehicle control signal output from the guidance module 33B, then steers the vehicle 3 to guide the trailer 5 along the target route R. A notification can be output by the HMI module 39 to notify the user when the trailer 5 is in the target destination $D_{TAR}$. The vehicle control system 1 can thereby facilitate reversing the trailer 5 to the target destination $D_{TAR}$.

The present invention is applicable to a range of different types of trailer 5. For example, the trailer 5 can be a caravan, a goods trailer, a flatbed trailer, a van trailer, a livestock trailer and so on. Similarly, the present invention is applicable to a range of different types of vehicles 3. For example, the vehicle 3 can be a motor vehicle, such as an off-road or sports utility vehicle; or a towing engine or tractor for a semi-trailer truck.

The control techniques described herein are a development of those described in the Applicant's earlier UK patent applications GB1307524.7 (filed on 26 Apr. 2013) and GB1307525.4 (filed on 26 Apr. 2013), the contents of which are incorporated herein in their entirety by reference. Furthermore, the contents of the Applicant's related application entitled "VEHICLE CONTROL SYSTEM" filed on the same day as the present application at the UK Intellectual Property Office are hereby incorporated in their entirety into the present application by reference.

It will be appreciated that various changes and modifications can be made to the vehicle control system 1 described herein without departing from the present invention. Rather than specify the target trailer destination $D_{TAR}$ by positioning the graphical image 41 on a video image, the graphical image 41 could be positioned on a static image such as a grid or mesh representing a predefined region around the vehicle 3.

Furthermore, although the vehicle control system 1 has been described with reference to a set of vehicle cameras 9, 10, 11 and a set of trailer cameras 29, 30, 31, it will be appreciated that a single camera could be provided on the vehicle 3 and/or the trailer 5. In a further alternative, the trailer cameras 29, 30, 31 could be omitted. A set of parking sensors provided on the trailer 5 could, for example, provide notification to the driver of any obstructions. The hitch angle $\phi$ could be measured directly, for example by a rotary encoder.

In a further alternative, a video image could be transmitted to the vehicle 3 from a remote camera (for example provided in a cellular telephone) over a wireless network such as Bluetooth®.

The invention claimed is:

1. A system for controlling a vehicle to facilitate reversing a trailer coupled to the vehicle, the system comprising a processor configured to:
    identify permissible target trailer destinations and impermissible target trailer destinations;
    receive a target trailer destination specified by a user;
    determine a current trailer position;
    model a target route from the current trailer position to the user-specified target trailer destination; and
    output a vehicle control signal for controlling the vehicle to guide the trailer along the target route;
    wherein the processor inhibits user selection of an impermissible target trailer destination.

2. The system of claim 1, wherein the target trailer destination comprises location data and/or orientation data.

3. The system of claim 1, wherein the target route comprises one or more curves joining the current trailer position to the target trailer destination.

4. The system of claim 3, wherein the vehicle control signal maps a center point of the trailer to the target route.

5. The system of claim 1, wherein the processor is configured to identify the permissible target trailer destinations based on a detected available space for the trailer.

6. The system of claim 1, wherein the processor is configured to receive image data from one or more video cameras disposed on the vehicle and/or the trailer.

7. The system of claim 6, wherein the processor is configured to identify one or more obstructions proximal to the trailer and/or the vehicle.

8. The system of claim 6, wherein the processor is configured to overlay the target trailer destination and/or a target route for the trailer on a video image from the one or more video cameras.

9. The system of claim 1, wherein the vehicle control signal comprises a steering control signal for controlling a steering angle of the vehicle.

10. A vehicle comprising the system of claim 1.

11. The system of claim 1, wherein the processor is configured to identify the permissible target trailer destinations based on at least one of a maximum permissible hitch angle, and a detected terrain parameter.

12. A method of controlling a vehicle to facilitate reversing a trailer to a specified target trailer destination, wherein the vehicle comprises a human machine interface (HMI) module, an electronic power assisted steering (EPAS) module, at least one camera, and a control unit having a guidance module and an image processing module, the method comprising:
    receiving at the control unit a user input via the HMI module that defines a user-specified target trailer destination, wherein the control unit is configured to identify permissible target trailer destinations for positioning the trailer and impermissible target trailer destinations unsuitable for positioning the trailer, the control unit being configured to inhibit user selection of an impermissible target trailer destination;
    processing image data from the at least one camera via the image processing module to determine a current orientation of the trailer relative to the vehicle;
    modeling a target route from a current trailer position to the user-specified target trailer destination via the guidance module; and
    outputting, via the guidance module, a vehicle control signal to the EPAS module for controlling the vehicle to guide the trailer along the target route.

* * * * *